Dec. 19, 1933.                J. A. STEIN                1,940,513
PROCESS FOR DETERMINING THE COMBUSTIBLE CONTENT IN A GAS MIXTURE
                        Filed March 19, 1932
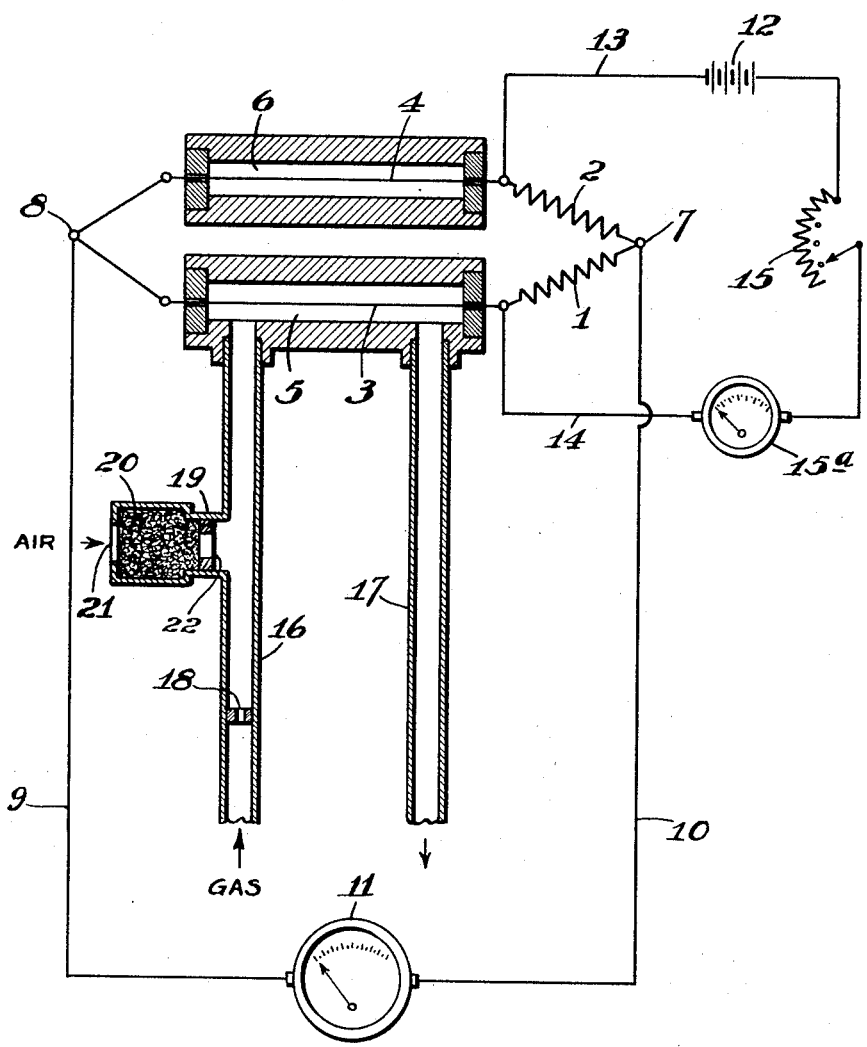
INVENTOR
J. A. Stein
by J. C. Bradley
ATTORNEY Patented Dec. 19, 1933

1,940,513

REISSUED

UNITED STATES PATENT OFFICE 1,940,513

PROCESS FOR DETERMINING THE COMBUSTIBLE CONTENT IN A GAS MIXTURE

Joseph A. Stein, Pittsburgh, Pa., assignor to Bacharach Industrial Instrument Company, a corporation of Pennsylvania Application March 19, 1932. Serial No. 600,044

1 Claim. (Cl. 23—232)

The invention relates to a process for measuring the combustible content of a gas. Ordinarily the gas to be tested is a gas of combustion in order to determine the completeness of combustion in the apparatus in which the gas is consumed, but the invention is applicable to the measurement of gases other than gases of combustion. The apparatus employed in the practice of the process is of the general type shown in the patent to Max Moeller No. 1,562,243, wherein the temperature of a catalyzing wire as affected by the gas burned adjacent the wire is used as the determining factor in ascertaining the percentage of combustible (gas) in the gas tested. Apparatus of this type has been used with some success in measuring the CO, $H_2$ and other combustibles in which the amount of combustible is low, that is not over 4 to 8 per cent of the gas tested, but serious difficulties have attended the use of the apparatus when the combustible content exceeds these percentages, which it is the purpose of the present invention to overcome. One of the main difficulties is the fact that the apparatus has been unreliable, due to the temporary or permanent failure of the catalyzing wire to function under varying conditions. A condition referred to as poisoning or contamination of the catalyzing wire arises when the combustible in the gas increases above a certain point. At such time the catalysis may fail so that the device ceases to record or indicate at all. In other cases, the device continues to indicate the percentage of combustible, but does so incorrectly. This failure is ordinarily merely temporary and is remedied when the combustible content decreases below a certain point, but in some cases it becomes permanent and a new catalyzing wire has to be substituted. The reliability of the device is also impaired when the catalyzing wire is overheated due to catalytic combustion of high percentages of combustible gas which is entirely apart from the failure of the wire due to poisoning. These liabilities to failure have greatly retarded the introduction and use of the apparatus, which in other respects, both as to cost and ease of use, is admirably adapted for testing gases.

My invention overcomes the difficulty above outlined, making the apparatus entirely reliable under any condition of use, so that no poisoning of the wire will occur or overheating thereof. The process may be employed for accurately determining the combustible, when such combustible ranges from 0 to 100 per cent of the gas tested, and no poisoning or overheating of the catalyzing wire occurs under any condition of use. The range of use of the apparatus is thus greatly broadened and the cost of operation due to replacements reduced to a minimum.

Briefly stated, this result is secured by diluting the gas measured with a volume of air which bears a definite relation to the volume of gas used, and which will guard the apparatus against failure of the catalyzing wire regardless of changes in the composition of the gas whose percentage of combustible is under determination. One form of apparatus suitable for carrying out the process is shown in the accompanying drawing, wherein:

The figure is a diagrammatic view partially in section.

The construction involves the use of a Wheatstone bridge arrangement in which 1 and 2 are standard resistances and 3 and 4 are a pair of resistance wires located in the chambers or tubes 5 and 6. The resistance wires are preferably made of platinum alloy although any other suitable alloy may be used which will act as a catalyzing agent when exposed to contact with gases of combustion and oxygen. The gases to be measured are caused to pass through the chamber 5 while the chamber 6 contains atmospheric air, the two wires which are of the same material, length and cross section thus serving as a basis of comparison as is well known in the art.

The points 7 and 8 are connected by the wires 9 and 10 forming a circuit in which is located an indicating instrument, such as the galvanometer 11. Operating current is supplied from a battery 12 in the circuit 13, 14 and this circuit is provided with a small variable resistance 15 and the ammeter 15a for the purpose of adjustment.

The gas of combustion to be analyzed is conducted to and from the tubular chamber 5 by the pipes 16 and 17, of which 16 is the inlet and 17 the outlet, the inlet pipe being provided with the orifice member 18. Connected to the gas inlet pipe 16 is an air inlet pipe 19 whose outer end is provided with a cavity having a cotton filter 20 therein. Admission of air to the cavity is afforded by the opening 21, and the orifice member 22 regulates the flow to the pipe 16. The filter 20 protects the pipe and its orifice from clogging with dirt.

The current supplied to the wires 3 and 4 is such as to heat them to a point where the wire 3 will ignite the combustible in the stream of gas by catalysis. The resulting combustion raises the temperature of the wire 3 still further, whereby the resistance of the latter is increased by an amount proportional to the heating effect of the combustible contained in the gas being tested. The change in resistance of the wire unbalances the circuit of the Wheatstone bridge, of which the heated wire 3 is one of the branches, and this causes a current which varies as the heating effect of the combustible in the gas to flow through the galvanometer 11 which is calibrated to read directly in per cent of CO and/or $H_2$, or any other combustible which it is desired to measure.

Heretofore in the operation of apparatus of this character, it has been the practice to admit an amount of air through the pipe 19 which is in excess of that required to support combustion, the ratio of the volume of air to gas being in all cases 1 to 1 or less, and such proportion has given a satisfactory operation when the percentage of combustible in the gas was relatively low, but when attempts have been made to use the apparatus in testing gas having a high combustible content, the apparatus has been unsatisfactory due to the poisoning or overheating of the catalyzing wire, as heretofore explained.

I have discovered that the range of the apparatus may be increased to any desired extent, without shortening its life, by a proper dilution with air of the gas tested, preliminary to its admission to the chamber carrying the catalyzing wire. With a proper dilution, the instrument may be used to indicate accurately the amount of combustible in the gas running up to 100 per cent, so that the one apparatus may be used for all classes of work. I have found that the volume of diluting air in order to insure a reliable and continuous operation of the apparatus under the widely varying conditions of combustible content must be very great, preferably in the neighborhood of twelve volumes of air to one of gas. Stated differently, the volume of air should be such that with a maximum combustible content in the gas tested, the air should carry an oxygen content which is at least twice that required to complete the combustion of the combustible content. In its preferred form, therefore, the process contemplates the admixture of a quantity of air with the gas which is many times in excess of that heretofore employed and far beyond that required to support combustion even when the combustible content may approach 100 per cent of the gas tested. The utility of the apparatus and process is not limited, however, to use of the particular ratio of air to gas specified, as lower range apparatus, in which the percentage of combustible in the gas tested is always low, will operate satisfactorily with smaller volumes of diluting air. For instance in the testing of gases in which the combustible never ranges over 16 per cent, the volume of air to that of gas may range as low as 2 to 1.

In the particular apparatus shown, the desired proportion of air to gas is secured by making the orifices 18 and 22 of the requisite relative size, the air orifice 22 being about 12 times the cross sectional area of the orifice 18. The volume of diluting air thus provided not only prevents any poisoning of the wire 3, but also prevents any overheating thereof. In the particular construction shown, the relative volumes of air and gas are governed by the size of the orifices 18 and 22, but the process is not limited to this means for controlling the relative volumes of gas and air. The air may be introduced under pressure so that the volume introduced may be controlled in the practice of the process in this manner rather than by the size of the orifice.

The apparatus will ordinarily be calibrated to indicate the percentage of CO and $H_2$ or a combination of the two, but may be calibrated to indicate the percentage of any other combustible gas.

What I claim is:

In a process of gauging the combustible content in gas in which such content varies through a wide range, and which involves heating a member of catalyzing material in a confined space electrically, and in supplying said gas through said space, the step of mixing said gas preliminary to its introduction into said chamber with a volume of diluting air which is greatly in excess of the volume of gas and in all cases has an oxygen content at least twice the theoretical amount necessary to support the combustion of the maximum combustible content in the gas.

J. A. STEIN.